United States Patent [19]

Berger

[11] 3,926,149

[45] Dec. 16, 1975

[54] SNAKE VENOM MILKER
[76] Inventor: Raymond D. Berger, 1504 40th Ave. Court, Rock Island, Ill. 61201
[22] Filed: Feb. 10, 1975
[21] Appl. No.: 548,883

[52] U.S. Cl. .................................. 119/1; 119/29
[51] Int. Cl.² ........................................ A01K 29/00
[58] Field of Search ................................ 119/1, 29

[56] References Cited
UNITED STATES PATENTS
3,459,158  8/1969  Mitchell, Jr. ........................ 119/29

Primary Examiner—Hugh R. Chamblee
Attorney, Agent, or Firm—Glenn H. Antrim

[57] ABSTRACT

A venom container resembles a small, inflated toy balloon except that the wall is made of thicker rubber-like material. The throat of the container is stretched over the end of a shaft that is used as a handle, and the shaft supports a resistive heating element within the container. Poisonous snakes have heat receptors by which they locate accurately warmblooded animals within striking distance. As a snake would strike its prey, it strikes the warmed container and injects its venom into the container.

3 Claims, 2 Drawing Figures

SNAKE VENOM MILKER

BACKGROUND OF THE INVENTION

This invention relates to equipments for milking venom from poisonous snakes and particularly to warmed resilient containers for luring snakes to strike and pierce the containers with their fangs.

Venom that is collected from poisonous snakes to manufacture serums is usually collected by persons who capture the snakes and hold them back of their heads. Pressure by a person's hands causes the snakes to open their mouths and expose their fangs. The lip of a glass or small jar is then placed back of the fangs of each of the captured snakes and rubbed along the upper part of the mouth where glands are located to cause secretion of venom through the fangs into the jar. Obviously, a great deal of care must be taken to handle poisonous snakes in this manner.

SUMMARY OF THE INVENTION

A device of this invention for milking venom from snakes comprises a warmed rubber-like ball attached to the end of a handle. Certain snakes such as the common poisonous snakes, rattle snakes, copperheads, and water moccasins have heat receptors that enable them to locate accurately nearby warm objects and thereby to prey on nocturnal animals. The heat receptors are in spaced cavities in the heads of the snakes so that they function at infrared frequencies, as eyes function at light frequencies, to locate sources of energy accurately. Until warmed bodies are brought very close to the snakes, the snakes are unable to distinguish any small moving warmed body from a small animal that it desires for food.

The warmed container is made from rubber-like material of such thickness that it can be easily penetrated by the fangs of poisonous snakes, but it cannot be readily torn. When snakes strike the container, venom is released into the container which can be subsequently emptied for use. A preferred embodiment has a spherical container with a throat like a toy balloon, and the throat of the container is placed over the end of a handle. A resistive heating element is also supported by the end of the handle such that it is centrally located within the container. In a laboratory model, the resistor is connected to a usual electric cord for connection to electric wiring.

DESCRIPTION OF THE PREFERRED EMBODIMENT

Figure 1:
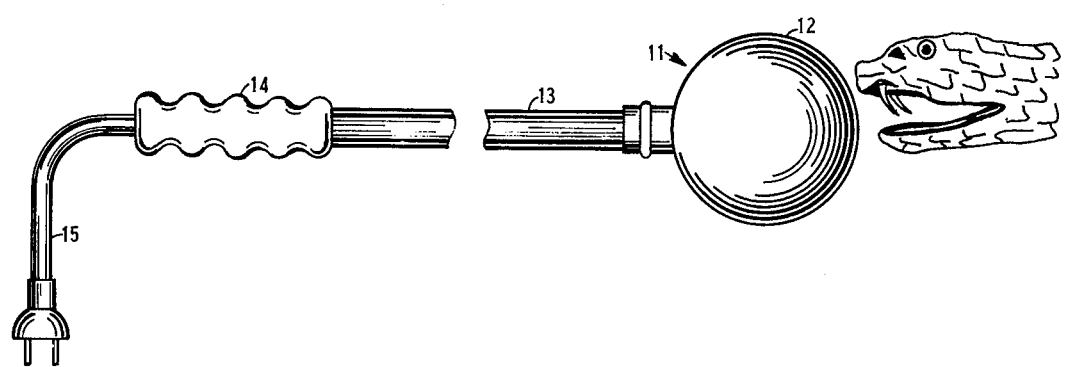
FIG. 1 is a side view of the venom milker of this invention.
Figure 2:
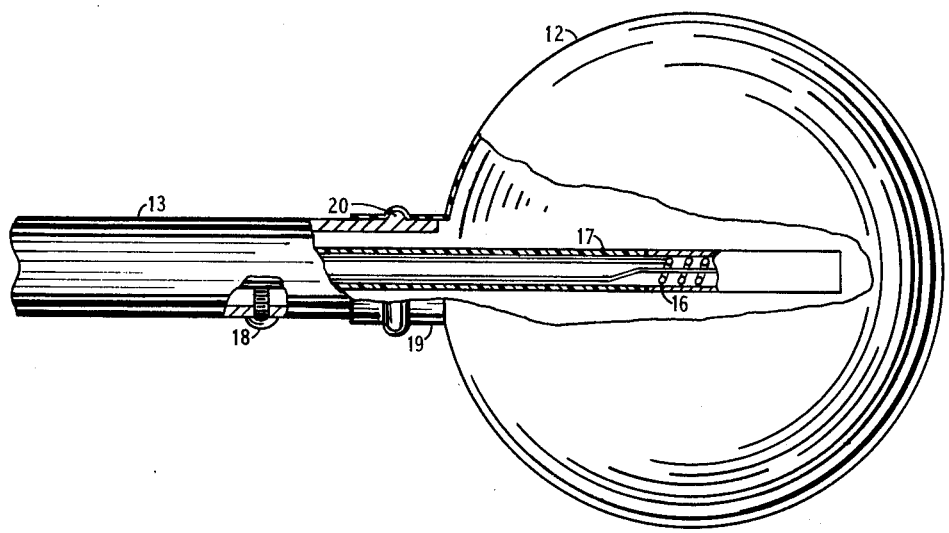
FIG. 2 is an enlarged view of the container of the milker with a portion cut away to show an interior heater.

A snake venom milker 11 has a rubber-like, spherical container 12 that is warmed to lure snakes to strike. The container 12 is connected to the end of a hollow shaft 13, and a grip 14 is attached to the opposite end of the shaft. The shaft 13 may be made of aluminum tubing or any other suitable material. An electric cord for connecting the heater 16 of FIG. 2 to a source of electric current extends down the hollow center of the shaft to the resistive element 16. The resistor 16 is supported in the center of the container 12 by a rigid extension that may be a piece of tubing 17 having one end positioned in an end of the shaft 13 and fastened thereto by suitable fastening means such as by screws 18.

The resistance of the resistor 16 is selected to provide sufficient heat to warm the container 12 to desired temperature after electric current has been flowing long enough to cause the temperature to become nearly constant. A suitable temperature would be between 38° and 54° centigrade.

The container 12 is preferably 5 to 8 centimeters in diameter and is made of rubber-like material that can be readily pierced by the fangs of poisonous snakes, but is heavy enough to prevent tearing. When the fangs are removed, the material, similar to the material that is used on the top of vials through which syringe needles are injected for obtaining serum from the vials, will seal. Because the wall of the container 12 is elastic, it can be provided with a throat 19 of the required diameter for stretching over the end of the hollow shaft 13. In shape, the container 12 will resemble a small, inflated, spherical toy balloon with a throat 19. In order to retain the container 12 securely, a circular bead 20 may be formed near the end of the shaft over which the throat 19 is to be stretched.

In operation, the electric cord 15 is connected to a suitable source of electric current and the resistive element 16 is allowed to come to nearly a constant temperature. Through the use of the handle 13–14, the warmed container 12 is moved along within striking distance of a venomous snake. The fangs of the snake penetrate the container 12, and the venom will be injected into the space within the container. The handle is kept pointed downwardly to keep the venom in the container 12 until it is removed to pour the venom into a storage container. To remove the container 12, force is applied to push the throat 19 off the end of the shaft 13. When required, the container 12 can be replaced easily and economically.

The use of current from usual power lines seems to be the most convenient when the snakes that are to be milked are in captivity. The resistive element 16 can also be heated by a battery contained in the shaft 13. Alternately, the container 12 can be placed in heated material or in a heated enclosure just before it is to be used. Although removal of the container 12 from the shaft 13, appears to be the simplest way to empty the venom, the end of the shaft 13 to which the container 12 is attached could be closed, and a valve added to the shaft near the container 12 for pouring out the venom.

I claim:

1. A snake venom milker comprising: a venom container having a wall of rubber-like material, said wall being of such thickness that it can be penetrated by the fangs of a snake and still not be torn by the snake, an extending handle, said venom container attached to one end of said handle, and heating means for warming said container.

2. A snake venom milker as claimed in claim 1 wherein said container is spherical and has a throat like a toy balloon, said throat being placed over the outside of said end of said handle and being readily removable for emptying the container of venom.

3. A snake venom milker as claimed in claim 2 wherein said heating means is an electrical resistive element attached to said one end of said handle and supported within said venom container, and means for connecting said resistive element to a source of electric current.

* * * * *